United States Patent

Purcell et al.

Patent Number: 6,167,422
Date of Patent: Dec. 26, 2000

[54] BOOTH MULTIPLICATION STRUCTURE WHICH SELECTIVELY INTEGRATES THE FUNCTION OF EITHER OF INCREMENTING OR NEGATING WITH THE FUNCTION OF BOOTH MULTIPLICATION

[75] Inventors: Stephen Clark Purcell, Mountain View; Nital Pankajkumar Patwa, San Jose, both of Calif.

[73] Assignee: ATI International SRL, Beaumont House, Hastings, Barbados

[21] Appl. No.: 09/099,575

[22] Filed: Jun. 19, 1998

[51] Int. Cl.[7] ........................................ G06F 7/52
[52] U.S. Cl. ................................................ 708/628
[58] Field of Search .................... 708/628–632, 708/490, 620, 625, 627

[56] References Cited

U.S. PATENT DOCUMENTS

| | | | |
|---|---|---|---|
| 5,485,413 | 1/1996 | Kuboniwa | 708/630 |
| 5,677,863 | 10/1997 | Naffziger | 708/628 |
| 5,892,698 | 4/1999 | Naffziger | 708/501 |

Primary Examiner—Tan V. Mai
Attorney, Agent, or Firm—Skjerven Morrill MacPherson LLP.; Edward C. Kwok

[57] ABSTRACT

A combination has a booth recoder with at least three input lines; two input lines corresponding to two bits of a multiplier and one input line being an increment select line. In one embodiment, signals representing the two bits of the multiplier are provided on the two input lines corresponding to the two bits. A controller selectively asserts a increment select signal on an increment select line, thereby incrementing the multiplier. Therefore, the present invention has the advantage of incrementing a multiplier while performing booth multiplication without requiring an additional adder for incrementing.

5 Claims, 1 Drawing Sheet

BOOTH MULTIPLICATION STRUCTURE WHICH SELECTIVELY INTEGRATES THE FUNCTION OF EITHER OF INCREMENTING OR NEGATING WITH THE FUNCTION OF BOOTH MULTIPLICATION

FIELD OF THE INVENTION

The present invention relates to booth multipliers, and more specifically, to a booth multiplication structure which selectively performs an increment or a negation in conjunction with booth multiplication.

BACKGROUND OF THE INVENTION

Booth recoding is a useful tool in reducing the number of steps and circuitry required to multiply a multi-bit multiplicand "a" (a[m:0]) by a multiplier "b" (b[n:0]), where "m" and "n" are non-negative integers.

In the remainder of this application, unless otherwise noted, to illustrate the invention, we will use as an example a 4 bit by 3 bit multiplication. That is, "m" is 4, "n" is 3, "a" has a value $-4_{10}$, and "b" has a value $-7_{10}$. Hence, bits a[4:0] are a binary signed representation of "a" having respective binary values 1, 1, 1, 0, and 0, and bits b[3:0] are a binary signed representation of "b" having respective binary values 1, 0, 0, and 1. However, the present invention applies to booth multiplication of integer or fractional multiplicands and multipliers of any length and value.

The following shows a longhand form for multiplying "a" by "b".

```
                1 1 1 0 0   (multiplicand = -4₁₀)
           ×      1 0 0 1   (multiplier = -7₁₀)
          ─────────────────
        1 1 1 1 1 1 1 0 0   (partial product #1)
        0 0 0 0 0 0 0 0     (partial product #2)
        0 0 0 0 0 0 0       (partial product #3)
        0 0 0 1 0 0         (partial product #4)
        ─────────────────
        0 0 0 0 1 1 1 0 0   (final product = 28₁₀)
```

As is known in the art, a 2's complement number can be extended to any bit length. Such sign extension is performed by padding on the left with "1" bits for negative numbers (e.g., partial product #1) and "0" bits for non-negative numbers (e.g., partial products #2, #3, and #4). Note that bit b[3] has a weight of negative 8.

The above longhand form is referred to as radix-2 multiplication. In radix-2 multiplication, each multiplier bit b[3], b[2], b[1], and b[0] is multiplied by the entire multiplicand "a" to produce a respective partial product. The number of partial products (e.g., four in the above example) equals the number of digits "n+1" in the multiplier "b".

However, a conventional radix-4 modified booth recoding technique reduces the number of required partial products in half compared to the above radix-2 multiplication as described below. For example, the operation a×b produces only integer[(n+2)/2] partial products (e.g., two partial products for bits b[3:0]).

FIG. 1 shows a conventional booth recoding circuit 100 which includes a booth recoder 110 having input lines 101–103 carrying signals representing respective bits b[1:−1] where b[−1] is a dummy bit having a value set at a binary zero. Booth recoder 110 receives the signal representing bits b[1:−1] (e.g., 0, 1, and 0, respectively) and outputs three signals representing bits NEG, ZERO, and TWO over respective lines 111–113 to partial product generator ("PPG") 120. Table 1 shows the values of NEG, ZERO, and TWO that booth recoder 110 outputs for each permutation of input bits b[2i−1:2i−3] (i.e., b[1:−1] in this example) and the first partial product PP1 output by PPG 120. Note that "$w_a$" is the weight of the least significant bit a[0] of "a", and "$w_b$" is the weight of the least significant bit b[0] of "b".

TABLE 1

| Values of Bits b[2i−1:2i−3] Respectively | Value of NEG, ZERO, TWO Respectively | PPG Output (PPi) |
|---|---|---|
| 0, 0, 0 | 1, 1, 0 | zero |
| 0, 0, 1 | 0, 0, 0 | $2^{(2i-2)} a w_a w_b$ |
| 0, 1, 0 | 0, 0, 0 | $2^{(2i-2)} a w_a w_b$ |
| 0, 1, 1 | 0, 0, 1 | $2^{(2i-1)} a w_a w_b$ |
| 1, 0, 0 | 1, 0, 1 | $(-1) 2^{(2i-1)} a w_a w_b$ |
| 1, 0, 1 | 1, 0, 0 | $(-1) 2^{(2i-2)} a w_a w_b$ |
| 1, 1, 0 | 1, 0, 0 | $(-1) 2^{(2i-2)} a w_a w_b$ |
| 1, 1, 1 | 0, 1, 0 | zero |

For clarity, "$w_a$" and "$w_b$" are equal to one in the above example since "a" and "b" are integer values. PPG 120 has input lines 111–113 carrying signals represented respective bits NEG, ZERO, and TWO and also has an input line 114 which carries a signal representing bits a[4:0]. According to Table 1, a high ZERO bit indicates that the partial product is zero regardless of the value of the NEG and TWO bits. If only the NEG bit is high, the partial product is −a while if only the NEG and TWO bits are high, the partial product is −2a. If only the TWO bit is high, the partial product is 2a while if no bits are high, the partial product is a.

A similar booth recoder and partial product generator are provided and similarly configured for each set of bits b[2i−1:2i−3] for each "i" where "i" is the set of all positive integers equal to or less than (n+2)/2 (e.g., "i" is 1 and 2 if "n" equals 3). Booth recoding is a technique that is known in the art and is described in, for example, *Principles of CMOS VLSI design, A Systems Perspective* (ISBN: 0-201-53376-6) on pages 547–555, and in, for example, *Modern VLSI design. A Systems Approach* (ISBN: 0-13-588377-6) on pages 235 to 238, which are incorporated herein by reference in their entirety. Sometimes, as in the above *Principles of CMOS VLSI design, A Systems Perspective* reference, a negated partial product is sent to adder 270 of FIG. 2 as a one's complement partial product (PP) accompanied by an increment control signal (N<1>) as on page 552 of *Principles of CMOS VLSI design, A Systems Perspective*.

It is often necessary to use booth multiplication to perform the operation shown in equation (1).

$$\text{product} = a \times -b \qquad (1)$$

"−b" is obtained from "b" according to equation (2) where b' is the 1's complement (i.e., all bits b[3:0] are inverted) of "b".

$$-b = b' + W_b \qquad (2)$$

Therefore, one conventional method to obtain "−b" is to increment the 1's complement of "b".

FIG. 2 shows a conventional circuit 200 for obtaining "product" of equation (1). Circuit 200 includes an inverter 252 which receives bus 253 carrying signals representing bits b[3:0] (e.g., 1, 0, 0, 1), inverts bits b[3:0] to obtain bits b'[3:0], and outputs signals representing bits b'[3:0] (e.g., 0, 1, 1, 0) on bus 254. Adder 260 receives the signals representing bits b'[3:0] on bus 254, receives a signal representing weight value "$w_b$" (e.g., one) on line 251, adds the weight value "$w_b$" to the 1's complement multiplier b', and outputs signals representing the resultant negated multiplier "−b" having bits −b[3:0] (e.g., 0, 1, 1, 1) on bus 261.

Bus 261 includes lines 262–265 which carry signals representing respective bits −b[3:0]. Booth recoders 210 and 230 receive signals representing bits −b[3:0] on lines 262–265 and receives a dummy bit −b[−1] having a binary value of zero from line 266. Booth recoders 210 and 230 send respective signals over lines 211–213 and 231–233 to respective partial product generators 220 and 240 where signals representing partial products PP1 and PP2 are output on busses 221 and 241, respectively, to adder 270 according to Table 1.

The circuit of FIG. 2 requires the use of an extra adder 260 in order to increment. Adder 260 requires space and time in order to perform the above operations. Furthermore, circuit 200 has no flexibility to selectively perform any operations other than "product=a×−b" of equation (1).

Therefore, what is desired is a circuit and method for flexibly performing booth multiplication operations such as "a×−b" using inputs "a" and "b" without using an extra adder before performing booth multiplication.

SUMMARY OF THE INVENTION

A combination has a booth recoder with at least three input lines; two input lines corresponding to two bits of a multiplier and one input line being an increment select line. In one embodiment, signals representing the two bits of the multiplier are provided on the two input lines corresponding to the two bits. A controller selectively asserts a signal representing a binary one on the increment select line which increments the multiplier. Therefore, the present invention has the advantage of incrementing a multiplier while performing booth multiplication without requiring an additional adder for incrementing.

DESCRIPTION OF THE INVENTION

Figure 1:
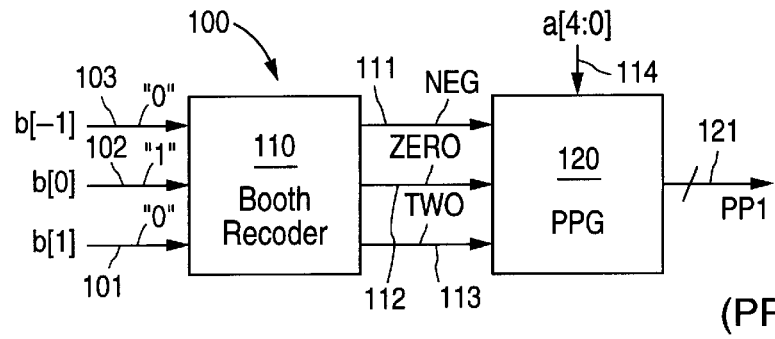
FIG. 1 shows a conventional booth recoding circuit.
Figure 2:
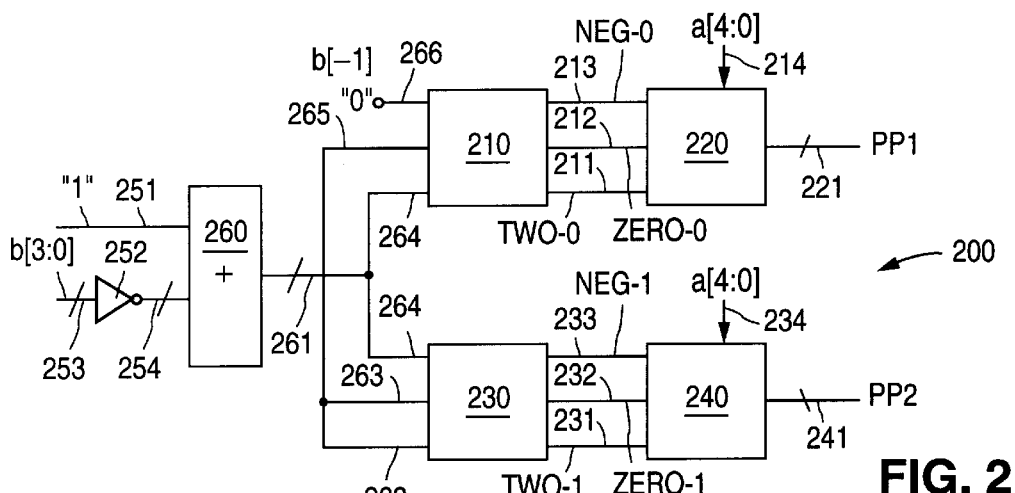
FIG. 2 shows a conventional circuit for performing booth multiplication and negating.
Figure 3:
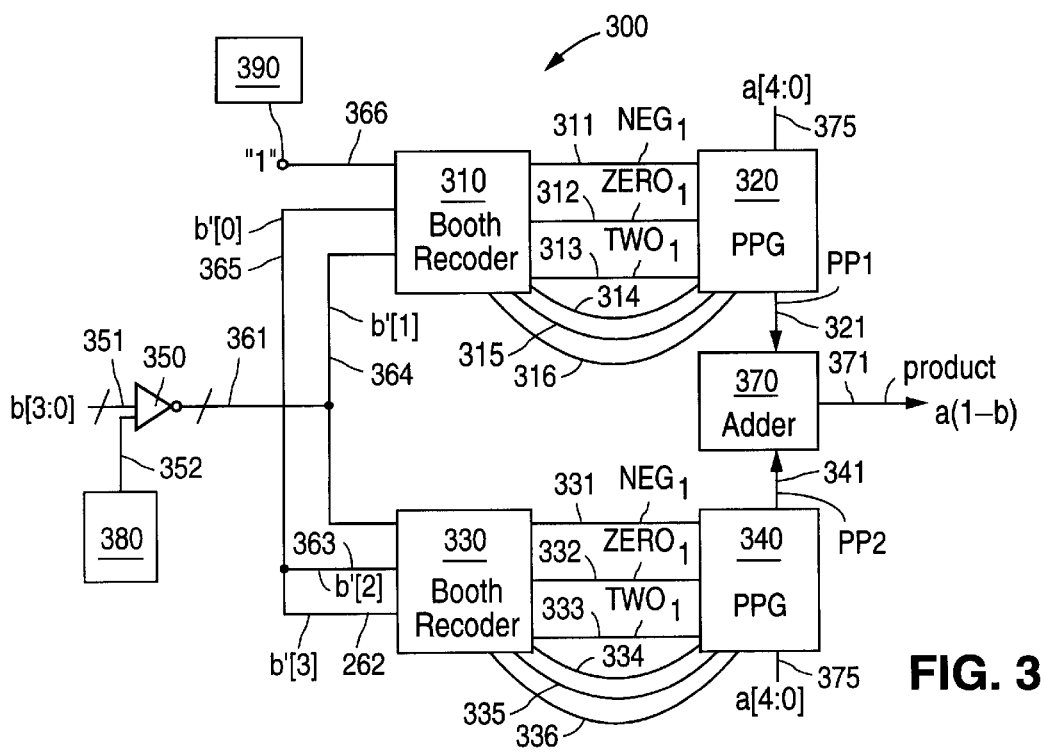
FIG. 3 shows a circuit according to the present invention.

FIG. 3 shows a circuit 300 for selectively accomplishing the booth multiplication operation of any of equations (3) to (6) using input values "a" and "b" without using an extra adder before performing booth multiplication.

$$\text{product}=a \times b \quad (3)$$

$$\text{product}=a \times (b+w_b) \quad (4)$$

$$\text{product}=a \times b' \quad (5)$$

$$\text{product}=a \times -b \quad (6)$$

Note that if "a" equals 11100 and "b" equals 1001, "2a" equals 11000, "−a" equals 00100, "−2a" equals 01000, "b'" equals 0110 and "−b" equals 0111.

Circuit 300 includes an inverter 350 which (i) receives signals representing bits b[3:0] (e.g., 1001) on bus 351 and (ii) selectively inverts the bits b[3:0] based on an inverter select signal on inverter select line 352 sent by a controller 380. Circuit 300 outputs signals representing the inverted bits b'[3:0] (e.g., 0110) on respective lines 362–365 of bus 361 if inverter 350 is selected, or outputs the original bits b[3:0] (e.g., 1001) if inverter 350 is not selected. Controller 380 asserts an affirmative inverter select signal on inverter select line 352 when controller 380 determines that the operation of equation (5) or (6) is to be performed. Controller 380 negates the inverter select signal on inverter select line 352 when controller determines that the operation of equation (3) or (4) is to be performed.

Booth recoder 310 receives signals representing values b[1:0] or b'[1:0] on respective lines 364 and 365 and an increment select signal representing bit b[−1] on increment select line 366. A controller 390 asserts an increment select signal on increment select line 366 when controller 390 determines that equation (4) or (6) is to be performed and negates the increment select signal on increment select line 366 when controller 390 determines that equation (3) or (5) is to be performed.

Booth recoder 310 outputs bits $\text{NEG}_1$, $\text{ZERO}_1$, and $\text{TWO}_1$, over respective lines 311–313 to PPG 320 which receives a signal representing bits a[4:0] on line 375. PPG 320 outputs a signal representing partial product PP1 on line 321, as defined in Table 1, for "i" equals 1. Similarly, booth recoder 330 receives signals representing values b[3:1] on respective lines 362–364 and outputs bits $\text{NEG}_2$, $\text{ZERO}_2$, and $\text{TWO}_2$ over respective lines 331–333 to PPG 340 which outputs partial product PP2 on line 341 in accordance with Table 1, for "i" equals 2.

In an alternative embodiment, signals TWOC, ONEC, ZERO, ONE, TWO, and MINUS (not shown) are provided over six lines 311–316 from booth recoder 310 to PPG 320 and over six lines 331–336 from booth recoder 330 to PPG 340 according to Table 2. Table 2 shows the output partial products PPi as a function of input bits b[2i−1:2i−3] and bits TWOC, ONEC, ZERO, ONE, TWO, and MINUS, respectively. In Table 2, "$w_a$" is the weight of the least significant bit a[0] of value "a" and "$w_b$" is the weight of the least significant bit b[0] of value "b". As applied to circuit 300 of FIG. 3, PPG 320 receives partial product PP1 for input values b[1:−1] and PPG 340 receives PP2 ("i"=2) for input values b[3:1].

TABLE 2

| Values of Bits b[2i−1:2i−3] Respectively | Value of TWOC, ONEC ZERO, ONE TWO, and MINUS Respectively | PPG output (PPi) |
| --- | --- | --- |
| 0, 0, 0 | 0, 0, 1, 0, 0, 0 | zero |
| 0, 0, 1 | 0, 0, 0, 1, 0, 0 | $2^{(2i-2)}aw_aw_b$ |
| 0, 1, 0 | 0, 0, 0, 1, 0, 0 | $2^{(2i-2)}aw_aw_b$ |
| 0, 1, 1 | 0, 0, 0, 0, 1, 0 | $2^{(2i-1)}aw_aw_b$ |
| 1, 0, 0 | 1, 0, 0, 0, 0, 1 | $(-1)2^{(2i-1)}aw_aw_b$ |
| 1, 0, 1 | 0, 1, 0, 0, 0, 1 | $(-1)2^{(2i-2)}aw_aw_b$ |
| 1, 1, 0 | 0, 1, 0, 0, 0, 1 | $(-1)2^{(2i-2)}aw_aw_b$ |
| 1, 1, 1 | 0, 0, 1, 0, 0, 0 | zero |

For example, the following longhand form shows the radix-4 multiplication of "a" and "b" that circuit 300 performs.

$$\begin{array}{r} 1\ 1\ 1\ 0\ 0 \quad (a) \\ \times \quad 1\ 0\ 0\ 1\ 0 \quad (b) \\ \hline \end{array}$$

Note that the right-most value of "b" shown above is bit b[−1] which represents the increment select bit. In the above example, "i" can take the integer value of 1 or 2 since "n" equals 3, PP1 is equal to $aw_aw_b$. Since $w_a$ and $w_b$ are each equal to one in the above example and since b[1:−1] is equal to "010", Table 1 or 2 provides that the first partial product PP1 is equal to $2^0(11100)(1)(1)$ or 11100. Therefore, a first partial product PP1 of the radix-4 multiplication is provided as follows:

```
      1 1 1 0 0      (a)
  ×       1 0 0 1 0  (b)
  ─────────────────
  1 1 1 1 1 1 1 0 0  (PP1 output to adder 370)
```

For the second partial product PP2, i.e., "i" equals 2, since b[3:1] is "100", Table 1 or 2 provides that the second partial product PP2 is equal to $(-1)2^3 a w_a w_b$ which equals $(-1)2^3 (11100)(1)(1)$ or 00100000. Therefore, a second partial product PP2 of the radix 4 multiplication is provided as follows:

```
      1 1 1 0 0      (a)
  ×       1 0 0 1 0  (b)
  ─────────────────
  1 1 1 1 1 1 1 0 0  (PP1 output to adder 370)
  0 0 0 1 0 0 0 0 0  (PP2 output to adder 370)
```

Finally, the two partial products PP1 and PP2 are added within adder 370 with the final carry discarded to produce the final step of the multiplication as follows:

```
      1 1 1 0 0      (a = −4₁₀)
  ×       1 0 0 1 0  (b = −7₁₀)
  ─────────────────
  1 1 1 1 1 1 1 0 0  (PP1 output to adder 370)
  0 0 0 1 0 0 0 0 0  (PP2 output to adder 370)
  ─────────────────
  0 0 0 0 1 1 1 0 0  (product = 28₁₀)
```

Note that this is the same result as was produced above by radix-2 multiplication.

The longhand radix-4 computation for the multiplication $a \times (b+w_b)$ is provided as follows:

```
      1 1 1 0 0      (a = −4₁₀)
  ×       1 0 0 1 1  (b + w_b = −6₁₀)
  ─────────────────
  1 1 1 1 1 1 0 0 0  (PP1 output to adder 370)
  0 0 0 1 0 0 0 0 0  (PP2 output to adder 370)
  ─────────────────
  0 0 0 0 1 1 0 0 0  (product = 24₁₀)
```

Note here that the value of "b" has been incremented by setting b[−1] equal to 1 and shifting PP1 left.

The longhand radix-4 computation of $a \times b'$ (i.e., the multiplication of equation (5)), where b' is the value obtained by inverting bits b[3:0], is provided as follows:

```
      1 1 1 0 0      (a = −4₁₀)
  ×       0 1 1 0 0  (b' = 6₁₀)
  ─────────────────
  0 0 0 0 0 1 0 0 0  (PP1 output to adder 370)
  1 1 1 1 0 0 0 0 0  (PP2 output to adder 370)
  ─────────────────
  1 1 1 1 0 1 0 0 0  (product = −24₁₀)
```

The longhand radix-4 execution of the multiplication $a \times -b$ (i.e., the multiplication of equation (6)), is provided as follows:

```
      1 1 1 0 0      (a = −4₁₀)
  ×       0 1 1 0 1  (b = 7₁₀)
  ─────────────────
  0 0 0 0 0 0 1 0 0  (PP1 output to adder 370)
  1 1 1 1 0 0 0 0 0  (PP2 output to adder 370)
  ─────────────────
  1 1 1 1 0 0 1 0 0  (product = −28₁₀)
```

Note that Tables 1 and 2 and the above longhand multiplication forms show that setting b[−1] equal to 1 increments the multiplier "b" by the weight "$w_b$".

Adder 370 receives the partial products PP1 and PP2 represented by the signals output from PPG 320 and PPG 340, respectively, and produces a signal representing a final product ("product") on line 371. The product on line 371 depends on the value represented on the inverter select line 352 and the value represented on the increment select line 366 in accordance with Table 3. "a" is the value represented by the input signal on line 315 and "b" is the value represented by the input signal on bus 351.

TABLE 3

| Inverter Select Line 352 Selected? | Increment Select Line 366 Selected? | Product |
|---|---|---|
| NO | NO | a × b |
| NO | YES | a × (b + w_b) |
| Yes | NO | a × b' |
| Yes | YES | a × −b |

Therefore, circuit 300 is a system for selectively performing the multiplication of equations (3), (4), (5), and (6) in booth multiplication without using an adder before booth recoding, thereby providing a substantial savings in processing time and space and providing flexibility of operation.

Although the above embodiment has been described with reference to a multiplicand and multiplier of a specific length (5 digits for "a" and 4 digits for "b"), the multiplicand and multiplier can be any length.

Although the above has describe values "a" and "b" as being specific binary integer values in which "$w_a$" and "$w_b$" are equal to one, "a" and "b" may contain a fractional portion and may have bits a[m:0] and b[n:0] that are different from the bits a[3:0] and b[n:0] in the example above. Furthermore, the lengths of "a" and "b" ("m+1" and "n+1", respectively) may be any positive integer. It will be apparent that changes in "n" may result in changes in the number of potential values for "i" and thus result in changes in the number of booth recoders and partial product generators. For example, in one embodiment, "n" is 7 which results in four booth recoders (i.e., "i" is the set of 1, 2, 3, and 4) or "n" is 8 which results in five booth recoders (i.e., "i" is the set of 1, 2, 3, 4, and 5).

Furthermore, although several lines and busses have been described, the function of the busses may be performed by lines in serial mode and the function of lines may be accomplished by busses in parallel mode.

Although the principles of the present invention have been described with reference to specific embodiments, these embodiments are illustrative only and not limiting. Many other applications and embodiments of the principles of the present invention will be apparent in light of this disclosure and the following claims.

What is claimed is:

1. A multiplier cell comprising:
   a selectably activated inverter receiving bits b[3:0], representing a Multiplicand expressed in 2's complement, said inverter receiving a first increment select signal and providing as output either bits b[3:0] or its bit-wise complement according to a logic value represented by said first increment select signal;

a first booth recoder receiving bits b[1:0] and a second increment select signal and providing a first set of output bits;

a second booth recoder receiving bits b[3:1] and providing a second set of output bits;

a first partial product generator receiving said first set of output bits from said first recoder, and a 5-bit value a[4:0], representing a second multiplicand expressed in 2's complement and providing a first partial product;

a second partial product generator receiving said second set of output bits from said second booth recoder and said 5-bit value, and providing a second partial product; and an adder summing said first and second partial products.

2. A multiplier cell as in claim 1, wherein said first and second increment select signals are provided a bit value of '1', said multiplier computes the product of 4-bit value, said 5-bit value, and −1.

3. A multiplier cell as in claim 1, wherein said second set of output bits comprises a 6-bit value c[5:0] generated according to input bits b[3:1] to said second booth recoder:

| b[3:1] | c[5:0] |
|---|---|
| 0, 0, 0 | 0, 0, 1, 0, 0, 0 |
| 0, 0, 1 | 0, 0, 0, 1, 0, 0 |
| 0, 1, 0 | 0, 0, 0, 1, 0, 0 |
| 0, 1, 1 | 0, 0, 0, 0, 1, 0 |
| 1, 0, 0 | 1, 0, 0, 0, 0, 1 |
| 1, 0, 1 | 0, 1, 0, 0, 0, 1 |
| 1, 1, 0 | 0, 1, 0, 0, 0, 1 |
| 1, 1, 1 | 0, 0, 1, 0, 0, 0. |

4. A multiplier cell as in claim 3, wherein said second partial product generator generates, in response to said bits c[5:0], partial products according to:

| c[5:0] | partial products |
|---|---|
| 0, 0, 1, 0, 0, 0 | zero |
| 0, 0, 0, 1, 0, 0 | 4a |
| 0, 0, 0, 1, 0, 0 | 4a |
| 0, 0, 0, 0, 1, 0 | 8a |
| 1, 0, 0, 0, 0, 1 | −8a |
| 0, 1, 0, 0, 0, 1 | −4a |
| 0, 1, 0, 0, 0, 1 | −4a |
| 0, 0, 1, 0, 0, 0 | zero | where a is said second multiplicand.

5. A multiplier cell as in claim 3, wherein said second partial product generator generates, in response to input bits b[3:1] received at said second booth recoder, output values according to:

| b[3:1] | partial products |
|---|---|
| 0, 0, 0 | zero |
| 0, 0, 1 | 4a |
| 0, 1, 0 | 4a |
| 0, 1, 1 | 8a |
| 1, 0, 0 | −8a |
| 1, 0, 1 | −4a |
| 1, 1, 0 | −4a |
| 1, 1, 1 | zero | where a is said second multiplicand.

* * * * *